(12) United States Patent
Holloway et al.

(10) Patent No.: US 6,435,032 B1
(45) Date of Patent: Aug. 20, 2002

(54) AIR SUPPLY PRESSURE REGULATOR WITH SUPPLY TANK PRESSURE GAUGE AND AIR SUPPLY PORT

(75) Inventors: Rocco Holloway; Roger Minich, both of Oakland, CA (US)

(73) Assignee: Dana J. Schwartz Money Purchase Plan, Oakland, CA (US)

( * ) Notice: Subject to any disclaimer, the term of this patent is extended or adjusted under 35 U.S.C. 154(b) by 0 days.

(21) Appl. No.: 09/309,190

(22) Filed: May 10, 1999

(51) Int. Cl.[7] .......................... G01L 7/22; A61M 15/00; A62B 7/00; A62B 9/02
(52) U.S. Cl. ............... 73/713; 128/202.13; 128/205.24; 128/201.27
(58) Field of Search ................... 73/713, 714; 137/557; 128/204.26, 205.22, 205.23, 201.27, 201.28, 202.22, 202.13, 205.24

(56) References Cited

U.S. PATENT DOCUMENTS

| | | | | |
|---|---|---|---|---|
| 3,719,198 | A | * | 3/1973 | Wilhelm et al. ............ 73/146.4 |
| 4,159,722 | A | * | 7/1979 | Walker ........................ 137/496 |
| 4,840,195 | A | * | 6/1989 | Zabrenski ................... 137/312 |
| 5,503,012 | A | * | 4/1996 | Rabizadeh ................. 73/146.8 |
| 5,899,204 | A | * | 5/1999 | Cochran ................. 128/205.23 |
| 6,070,577 | A | * | 6/2000 | Troup ..................... 128/205.22 |
| 6,082,396 | A | * | 7/2000 | Davidson ............... 137/505.25 |
| 6,209,579 | B1 | * | 4/2001 | Bowden et al. ............. 137/557 |

\* cited by examiner

Primary Examiner—Benjamin R. Fuller
Assistant Examiner—Jermaine Jenkins
(74) Attorney, Agent, or Firm—Donn K. Harms

(57) ABSTRACT

An improved regulating and gauging device for attachment to tank fed breathing apparatus used in such endeavors as scuba diving or fire fighting. On the body of the device are components which concurrently function to provide the diver or other user with a single source for what are conventionally, multiple components of a pressure gauge, a regulator, and a buoyancy compensating control unit. The device has mounted in or upon the device body, a mechanical or digital display of the remaining tank pressure in the attached supply tank, and thus breathable air supply. Also provided are an outlet to a buoyancy control bag, and a quick connect air supply port for another person to use in emergencies, or as needed. Additional utility is achieved by the provision of the pressure gauge which is mounted upon the exterior buoyancy compensating control unit body where the user can easily see it during use. Optionally a microprocessor fitted with software to calculate and display real time remaining air supply based on current usage levels may be provided when used with a digital electronic gauge.

20 Claims, 6 Drawing Sheets

AIR SUPPLY PRESSURE REGULATOR WITH SUPPLY TANK PRESSURE GAUGE AND AIR SUPPLY PORT

BACKGROUND OF INVENTION

1. Field of Invention

The present invention relates to equipment for use with self contained underwater breathing apparatus (Scuba). More particularly, it relates to an improved buoyancy compensator controlling unit, which communicates directly with the high pressure of a supply tank, and has a supply tank pressure gauge and selectively accessible air supply port on the same unitary structure.

2. Prior Art

Scuba diving the world over, whether it be A commercial endeavor or for sport diving, is extremely equipment dependent. The quality and performance of the scuba-diving equipment not only affect the quality of the underwater experience, such equipment has life threatening consequences should it malfunction or be confusing to operate to a dazed or inexperienced diver. Further, the cost of scuba-diving equipment to thousands of users is directly proportional to the number of parts that must be interconnected on the tank and hose apparatus used for diving.

The embodiments of the device disclosed herein are directed at an improved buoyancy compensator control unit for the control of the amount of buoyancy provided by the lift bag conventionally used by divers to achieve neutral buoyancy while submerged. The control unit features a single structure which includes other parts of the conventional diving apparatus thus lessening the number of components that need individual attachment or communication with the compressed air supply being used. The device thereby provides for an easy view of a real time gauge of remaining air supply pressure as well as an on board selectively connectable air supply port which can be used to supply air to another diver breathable air, or, for other purposes on demand such as air blasting of sand when treasure hunting underwater.

Conventionally used scuba apparatus features a compressed air tank for storage of highly compressed air. The air or mixture of gases so compressed and stored, in use is disbursed over a period of time, to provide a breathable air supply to a diver while submerged. Four hoses are conventionally used in current scuba-diving devices. Of those four lines, three hose lines are attached to a regulator which at an entry chamber is in communication with high pressure air from the tank. The regulator lowers that pressure internally and communicates this air supply to the three hoses at the lowered and constantly regulated pressure. A fourth hose is attached to the tank at one end and communicates an unregulated pressure therethrough at the tank pressure to a pressure gauge located at the distal end.

The three hoses communicating lower pressure air from the regulator each attach to a different component supplying low pressure air thereto during the dive. A first hose attaches to the regulator on one end and at the distal end to the diver's mouthpiece thereby communicating a breathable air to the diver at the properly regulated pressure for the depth underwater in which the diver is breathing.

The second hose is attached at one end to the regulator and at a distal end to a lift bag to provide control over the buoyancy of the diver while underwater. This second hose communicates regulated low pressure air to inflate the lift bag when the diver desires additional buoyancy to be imparted to the diver attached to the lift bag. Should less buoyancy be desired to allow the diver to descend, the bag may be purged of some air by a selectively operable valve communicating with the air supply in the lift bag. Should more buoyancy be desired to help the diver ascend or to reach a state of neutral buoyancy while underwater, air can be injected to the bag using a selectively operable valve, on the second hose, to allow regulated air to pass to the lift bag from the hose and ceasing when the valve is closed. Thus the diver can selectively control his buoyancy to a desired state during the dive, thereby helping conserve energy and to make the dive more enjoyable.

The third of the three low pressure hoses conventionally has a fitting at the end distal to its communication with the regulator. Attached to this fitting by threaded engagement or compression fit or other conventional manner of substantially permanent attachment, is a breathing device operatively communicable with the diver's mouth for use in emergencies by the wearer or by another diver. Thus, another diver in need of an air supply in an emergency can use this back up breather to obtain air should the need arise.

As noted, the fourth hose communicates unregulated air pressure from the tank, to a pressure gauge mounted on the distal end of this high pressure hose. The gauge provides continual readings of the remaining air pressure in the communicating tank, thus providing the diver valuable information about the nature and potential duration of the air supply remaining in the high pressure tank.

As is obvious, the number of hoses dangling from the scuba diver during a dive is cumbersome. What is more important, the hoses are an accident waiting to happen in the close confines encountered by divers in sunken ships and underwater obstacles. Danger from such hoses is also encountered while swimming through dense kelp beds which have a natural propensity to wrap around such hose lines and entangling them and the diver.

Further, pressure gauges now conventionally attached to the distal end of a high pressure hose inhibit an easy and constant monitoring of remaining air by the diver. This is because the hose attached to the tank at one end, and the gauge at the distal end, drags behind the diver when swimming. Thus, the diver cannot see the gauge without stopping and grasping the gauge in one hand to bring it to view. Such a nuisance not only makes for a diver that is less diligent about monitoring remaining air, it also wastes the valuable breathable air supply due to increased body movement. Such increases are necessitated by the interruption of the diver's gliding in the water and excess swimming strokes caused by the need to stop, tread water, and grope for the gauge to view it. Prior art has attempted to address some of the aforementioned problems but without great success.

U.S. Pat. No. 4,328,798 (Isaacson) teaches a breathing device supplied by regulated compressed air with a fitting for a second air supply for another person. However, Isaacon does not address the issue of placing the tank pressure gauge in easy eyesight of the user nor does Isaacson address the issue of the buoyancy compensating using for a diver.

U.S. Pat. No. 4,449,524 (Gray) provides for the attachment of a second breathing apparatus to a regulator but fails to address the issue of a continually visible pressure gauge and user operable inflation valve.

Other art teaches various devices for use with breathing apparatus attached to pressurized air tanks, but none address the removing the dangers of multiple hoses or providing an easily viewed high pressure tank gauge to monitor remaining the remaining air supply.

As such, there exists a need for an easily and inexpensively manufactured, multi functional buoyancy control unit, which provides for a regulated air supply to a diver using scuba, snuba, a rebreather or other devices which also required a regulated air supply for breathing and buoyancy control. A further need exists for an easily viewed pressure gauge which affords the user constant easily viewed information about the remaining supply of air supply without the need to search or grope for the gauge. A further need exists for such a buoyancy control unit that provides for the elimination of the cost and danger caused by conventional four hose attachments to the air tank, concurrently providing an access port to the air supply with an easy connection.

SUMMARY OF THE INVENTION

Applicants' device is an easily manufactured and utilized apparatus providing an improved buoyancy control device to regulate buoyancy provided by a communicating buoyancy compensating lift bag conventionally used by scuba divers, using scuba, snuba, or re-breathing equipment in conjunction with a buoyancy compensator to control their buoyancy while underwater. On the body of the device are components which concurrently function to provide the diver with a single source for what are conventionally, multiple components. The device has mounted upon the device body, a monitor of the breathable air supply by causing the pressure of the communicating pressurized air supply tank and a quick connect/disconnect air supply port which eliminate the hose conventionally used for this feature. The air supply port is easily accessible on demand should a regulated air supply be needed for another diver to breathe, or, any other reason while submerged. This quick connect air supply port is unlike currently conventionally manufactured diving setups which have a mouthpiece permanently attached to a separate hose communicating with the regulated air supply and thus provides much more utility to the supply port. Using this quick connection feature, a diver can choose to carry an extra connectable mouthpiece on his person leaving the air supply port available for other uses such as a blower for moving sand from underwater or a hand tool requiring regulated compressed air. Or, the user can leave a mouthpiece removably attached for quick disconnect should the need for regulated air for another purpose arise, that need can be met by easy attachment of another hose to the port.

The unique design of the disclosed device also provides for the elimination of two of four hose lines conventionally used and required in conventional scuba equipment. Not only does this elimination of hoses provide for a more economically produced product, it also eliminates a significant safety hazard from the additional two free floating hose lines which might catch on underwater obstacles frequently encountered in small areas of sunken ships, or, swimming in densely packed underwater kelp.

Additional utility is achieved by the provision of a pressure gauge which is mounted upon the exterior Buoyancy Compensating Control unit body. As earlier noted, in conventional scuba equipment, the pressure gauge is traditionally placed on a separate hose line, which communicates directly with high pressure in the air supply tank. This gauge hose generally drags in the water and hangs to the side of the diver while underwater. Thus, a diver desiring to ascertain the pressure remaining in the air supply tank, and his time left with a breathable air supply, must conventionally stop, and then pull the gauge in front of his face mask to read it. On the improved mechanism herein disclosed, the pressure gauge is positioned on the outside of the body of the buoyancy control unit rendering the gauge just a glance away from diver's view while swimming. To ascertain the air supply left to sustain the dive, a quick glance to the outside of the body of the buoyancy control unit will yield this often required information concerning remaining air supply. Thus, vital the user is available without stopping or the need to grapple for the conventionally mounted gauge saving time, energy, and air consumption from the aforementioned needless physical activity conventionally involved with checking air supply.

An object of this invention is providing a buoyancy control unit for attachment to and communication with, a buoyancy compensation lift bag, to provide improved real time control of the buoyancy afforded the diver by buoyancy compensation lift bag device.

Another object of this invention is to provide additional safety to the user, and fellow divers, by the provision of an easily accessible, quick connecting air supply port, for use by any diver with a back up breather having a mating quick connection.

A further object of this invention is the elimination of potentially dangerous extra air supply hoses currently required of conventional scuba apparatus using three low pressure hoses and one high pressure hose by providing the functions of multiple hose units on the body of the disclosed device.

An Additional object of this invention is to provide a real time gauge of a communicating air supply which is easily viewed by a diver without the need to grasp the gauge to bring it to view.

Another object of this invention is the provision of a breathable air supply through the buoyancy lift bag in during emergences which can be used as a re-breather.

Further objects of the invention will be brought out in the following part of the specification, wherein detailed description is for the purpose of fully disclosing the invention without placing limitations thereon.

BRIEF DESCRIPTION OF DRAWING FIGURES

DETAILED DESCRIPTION OF THE PREFERRED EMBODIMENTS OF THE INVENTION

Figure 1:
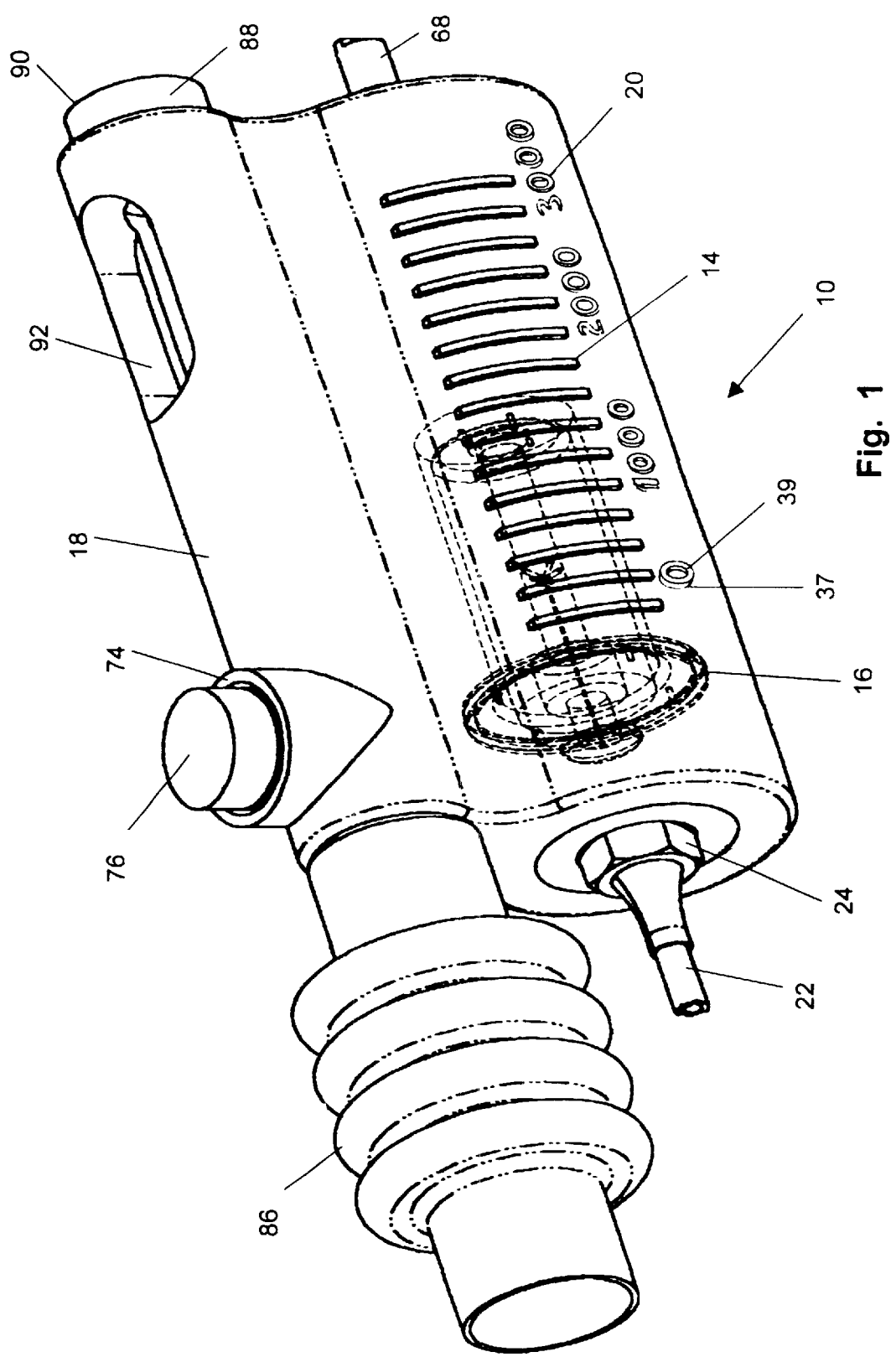
FIG. 1 is a perspective view of the mechanically gauged embodiment of the buoyancy control unit featuring a mechanically activated pressure gauge.
Figure 2:
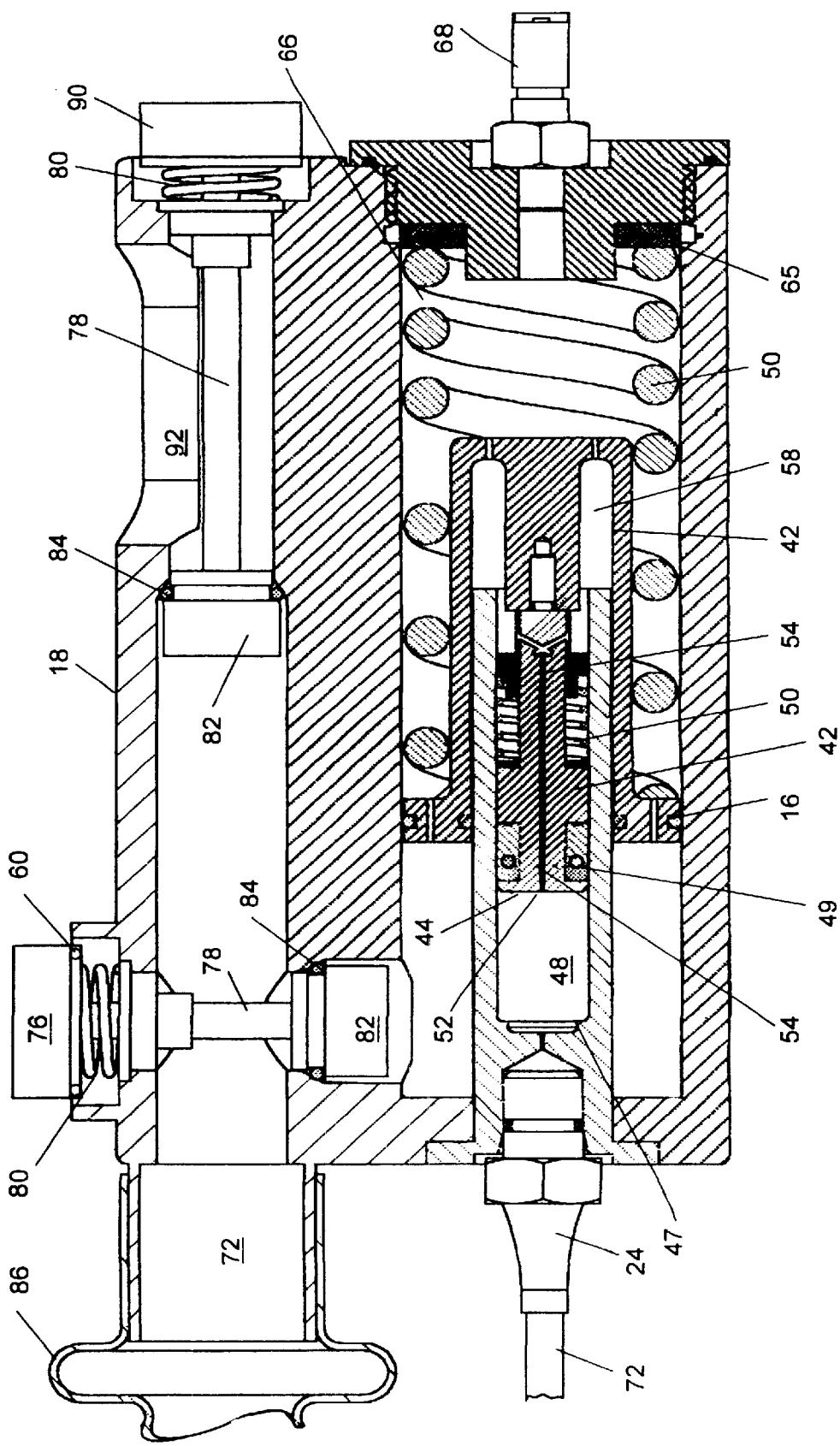
FIG. 2 is a cut away side view of the mechanically gauged embodiment of the buoyancy control unit.
Figure 4:
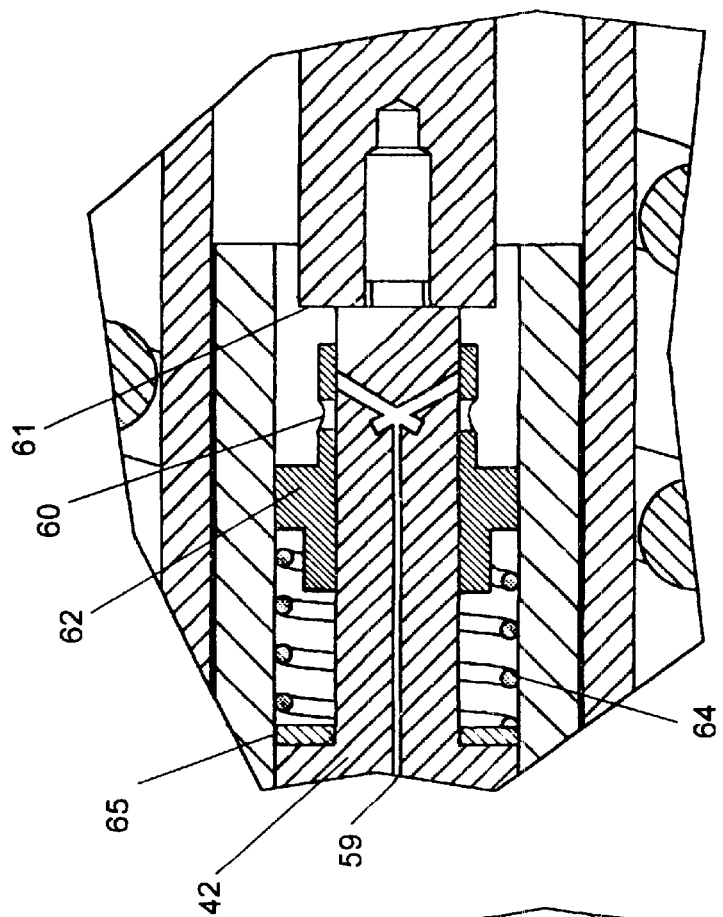
FIG. 4 is an enlarged view of a portion of FIG. 2 in a closed position.
Figure 3:
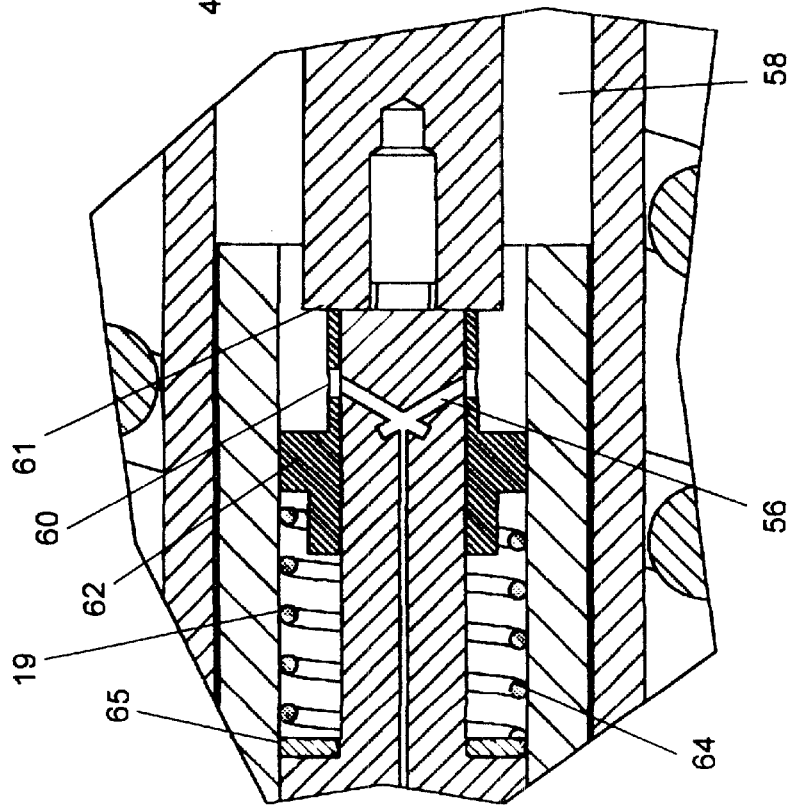
FIG. 3 is an enlarged view of a portion of FIG. 2 showing the translatable pressure in an open position.
Figure 5:
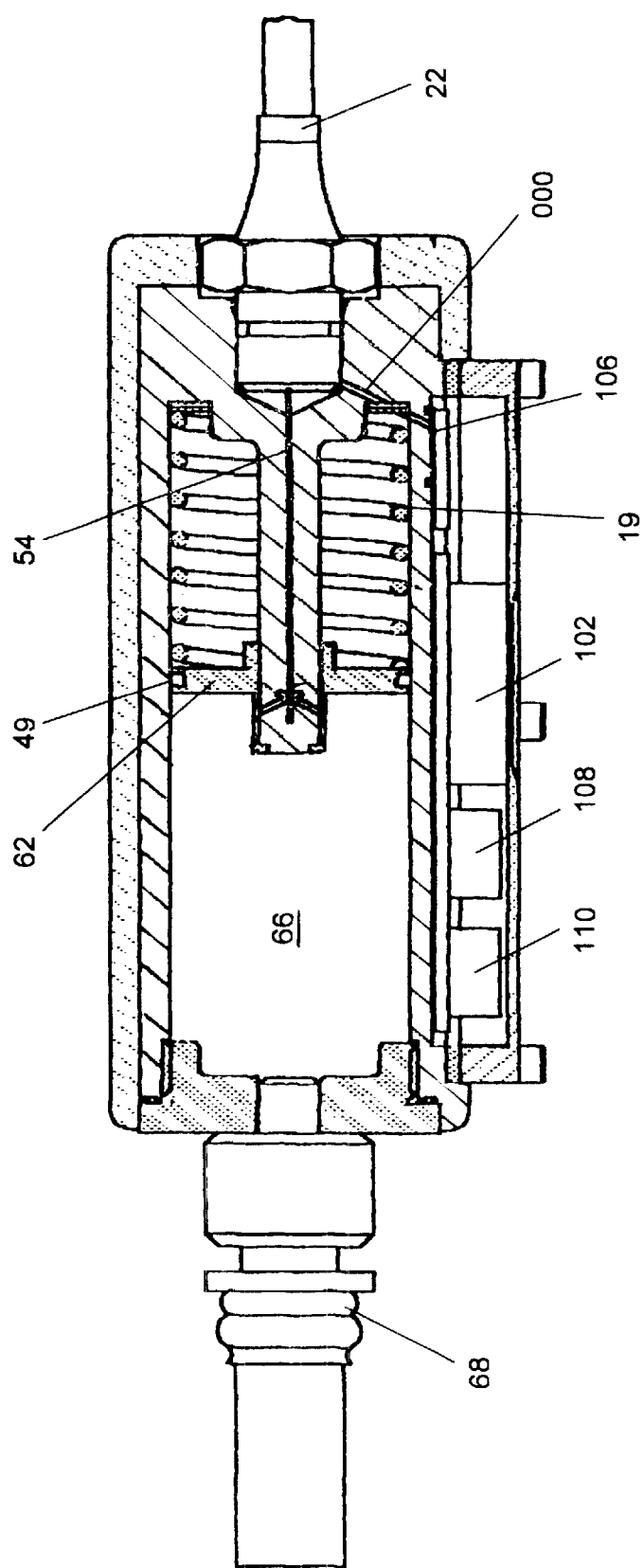
FIG. 5 is a top view of the digital gauged embodiment of the invention.
Figure 6:
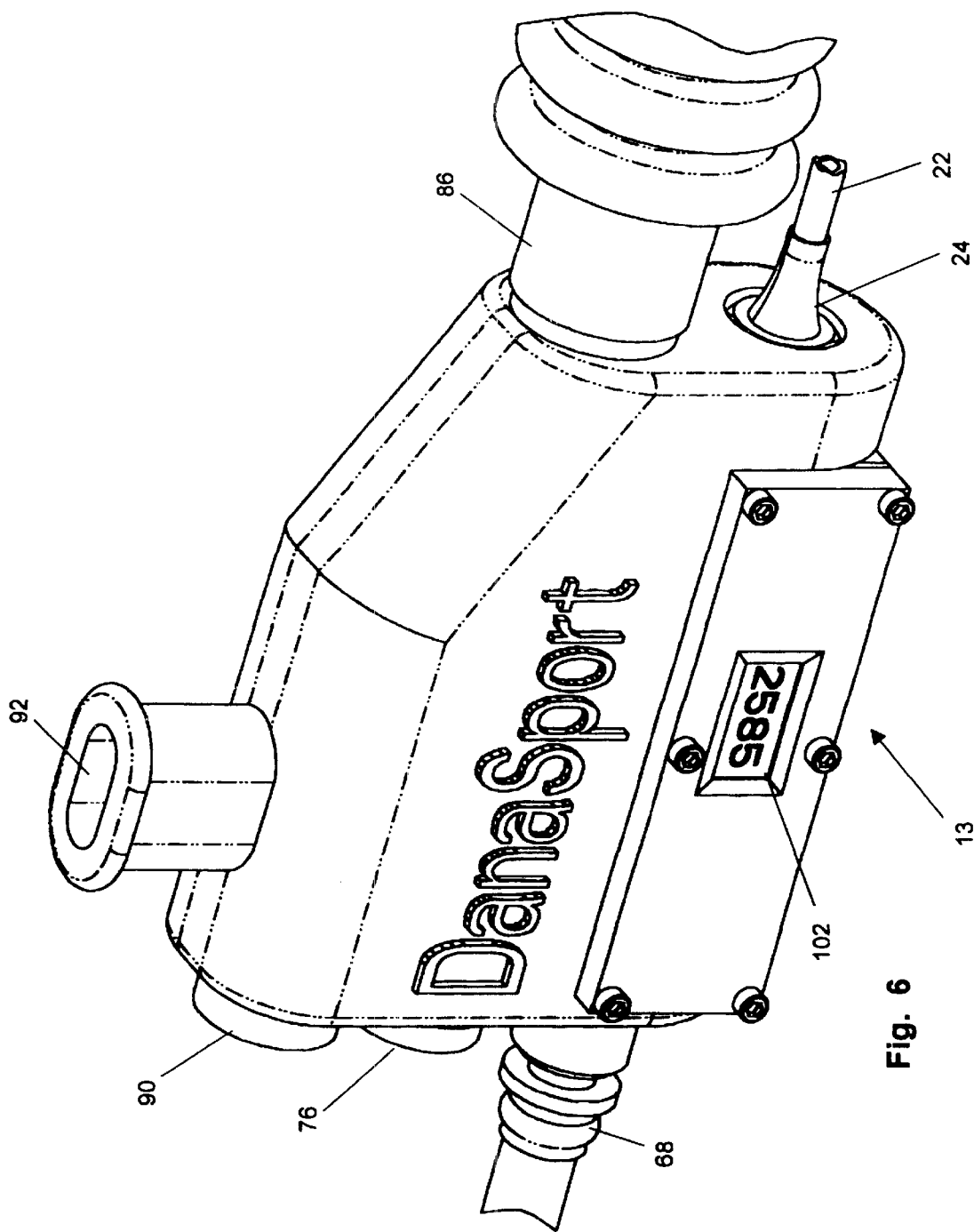
FIG. 6 is an exterior perspective view of the digitally gauged embodiment of the buoyancy control unit herein disclosed.
Figure 7:
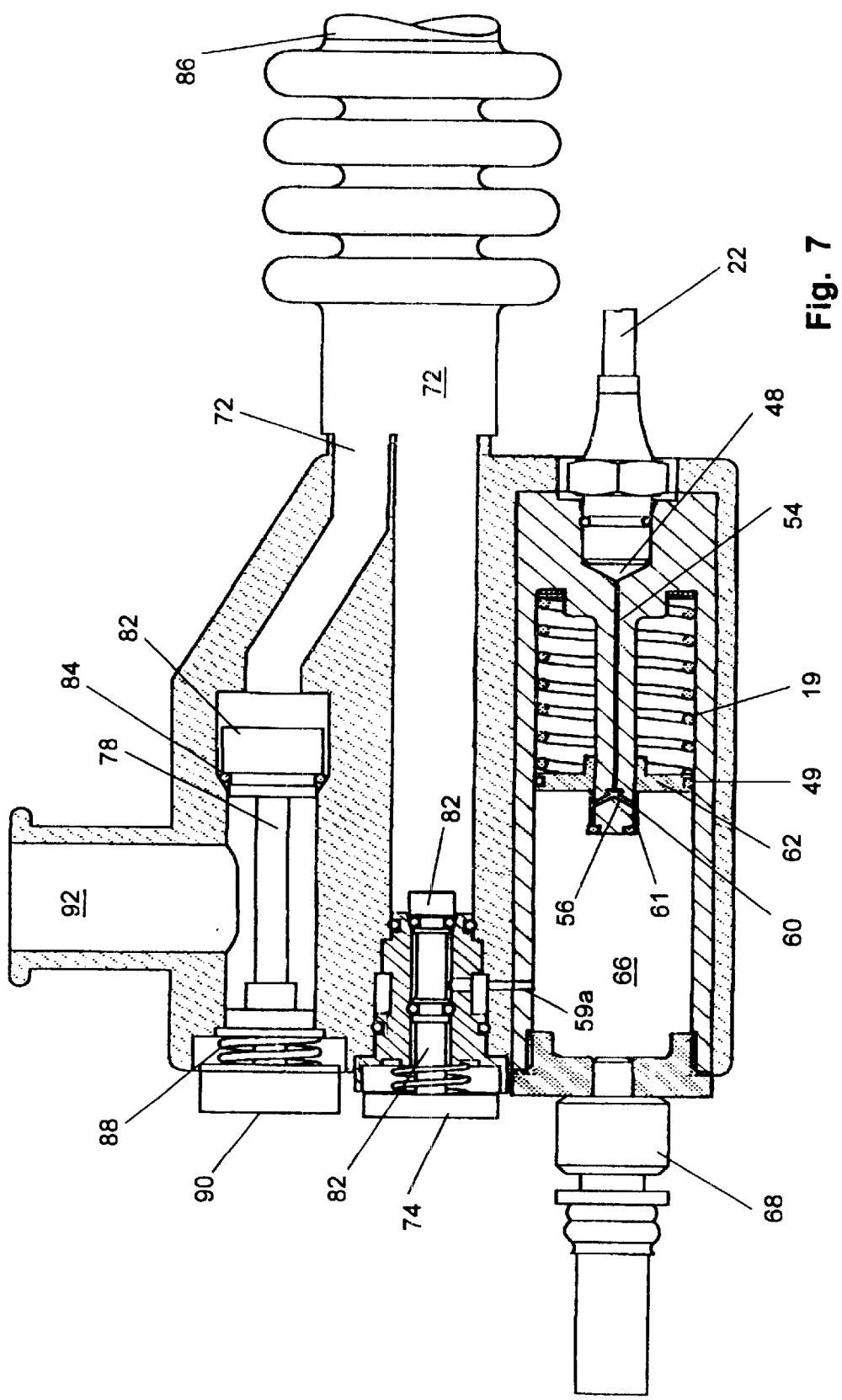
FIG. 7 is a cut away side view of the digitally gauged embodiment of the buoyancy control unit herein disclosed.

Referring now to the drawing FIGS. 1–7, specifically FIG. 1 and FIG. 2 disclose a preferred embodiment of the disclosed buoyancy control unit 10 featuring a reciprocating means to determine remaining supply tank pressure in the form of a mechanically operated pressure gauge 12 which when attached to a scuba tank to be used in combination herewith, will display a reading of remaining tank pressure in the tank. The mechanical pressure gauge 11 is provided by the functional relationship of transparent slots 14 or other markings to show lateral translation, located in the side of control body 18 which are arranged parallel to each other in a linear fashion much like a thermometer. Indicia 20, calculated to indicate relative tank pressure of the communicating tank for use in combination with the device herein disclosed, is placed in appropriate positions adjacent to the appropriate slots 14 thereby yielding a pressure gauge 11 when viewed in combination with markings visible through the slots located on the reciprocating piston 12. The transparent slots 14 are made of a material that will stand up to the regulated pressure from the attached scuba tank while being sufficiently transparent to allow viewing of a means for viewing lateral translation of the piston 12 such as a marker on the piston or as in the current best embodiment, a piston mounted the O ring 16. Of course other means for determining piston position other than the O ring 16 such as painted lines on the piston 12, grooves in the piston 12 or other such easily viewed markers and such are anticipated.

The pressure resistant material used in the transparent slots 14 should be able to mate in a sealed relationship with the surrounding body 18 which is best made from one or a combination of aluminum, brass, or plastic material also having the ability to withstand the pressure of incoming compressed air from the attached tank. While the current best mode of the disclosed device features the slots 14, formed in the body 18, the reading of the O ring 16 could also be accomplished using one long transparent piece with indicia 20 on the transparent piece. This would allow the user to see the position of the laterally translating O ring 16 in the respective position next to indicia 20 located on the body 18 thus yielding a means to indicate remaining tank pressure using the relationship of the O ring 16, laterally translating in relation to more, or less, communicating pressure from the air tank. The indicia 20 is placed in positions to register relative tank pressure in relation to the translation.

The O ring 16 in the current best mode as it is easily locatable and replaceable on the reciprocating piston and of a color easily viewed through the transparent slots 14 is mounted upon a laterally translatable piston 42 of pressure regulator 40 which is mounted internally in an operatively dimensioned regulator chamber 46 of the control unit body 18. The current best mode using the O ring 16 would feature a florescent material which would reflect light, or a phosphorescent material which would glow in subdued light underwater. The best current colors are bright red or yellow material which would be easy to see underwater and if the lines or grooves were used instead of the O ring they would be of a similar bright color.

The high pressure air supply is communicated to the piston 42 through high pressure hose 22 which is attached at the other end to the high pressure air supply to be used in combination herewith. Lateral translation of the piston 42 against a piston biasing means such as piston biasing spring 50 inside an operatively dimensioned elongated regulator chamber 46 is directly proportional to remaining air pressure being communicated to the piston 42 from an attached conventional scuba air tank or other compressed air supply through high pressure hose 22. Consequently, the O ring 16 circumferentially attached to, and moving in unison with, the piston 42, helps support one end of the piston 42 while it moves laterally in a manner that is directly proportional to the amount of air pressure remaining in the supply tank attached to high pressure hose 22. When the laterally translating O ring 16 or other means of marking the piston 12 is viewed through one of the transparent vertical slots 14, next to indicia 20, operatively positioned to accurately register the O ring 16 lateral translation caused by remaining air supply pressure, a means to indicate remaining tank pressure in the attached tank is provided to the user.

Indicia 20 on the exterior of the control unit body 18 would be placed to indicate the relative air pressure in the communicating tank based upon lateral translation of O ring 16 on the piston 42 which moves against the bias of spring 50. The indicia 20 may be printed upon the body 18 or formed into the body 18 itself so long as the positioning of the indicia 20 on the body 18 will register a substantially accurate tank pressure when the O ring 16 is viewed through the appropriate adjacent slot 14.

As noted, Lower tank pressure will cause the piston 42 to translate to a position where indicia 20, properly located, will indicate tank pressure is lower using the position of the O ring 16, viewed through the adjacent slot 14. Conversely, higher tank pressure communicated to the piston 42 will translate and overcome bias of the spring 50 whereby the attached O ring 16 will be viewed through a slot 14 situated adjacent to indicia 20 which indicates higher tank pressure. This interaction of translating piston 40 and O ring 16 and slots 14 in direct proportion to communicated tank pressure, thus provides a mechanically activated pressure gauge means whereby the user may ascertain remaining air tank pressure by viewing the O ring 16 in the slots 14 adjacent to the pressure indicating indicia 20. Of course to those skilled in the art a single elongated transparent slot other manner of allowing for viewing the O ring 16 laterally translating inside of the body 18 of the unit 10 could also be used, but the current best mode features a series of vertical slots 14 placed parallel to each other substantially perpendicular to the elongated body. The disclosed arrangement is easily viewed in the low light of the submerged environment with the indicia 20 easily related to the slot 14 which shows the relative position of the florescent or bright colored O ring 16 and thus relating to the diver information concerning the internal tank pressure of the tank to be attached to the device disclosed herein.

Should factory adjustment of the bias provided by the piston spring 50 be required to fine tune the accuracy of the pressure gauge 11, shims 51 may be placed to one end of the spring 50 to increase the bias, and an optional metering gauge 38 of known accuracy, can be attached to an optional threaded access in the body 18. This will allow the metering gauge 38 to communicate with the high pressure incoming from the air supply and thereby read that pressure so that the person adjusting the accuracy of the pressure gauge 11 may use a shorter piston spring 50 should lower adjustment be necessary or shims 51 should a higher adjustment be necessary. The metering gauge 38 can then be removed and a conventional plug 39 placed in the metering gauge hole 37 or left in for a period to test the continued accuracy of the pressure gauge 11 during operation.

As noted earlier the device herein disclosed is multi functional and features a gas pressure regulator 40 to regulate incoming high pressure from the tank communicated through hose 22. High pressure hose 22 is connected to the body 18 with conventional threaded or other fitting 24 which is mated on one end to the hose 22 and the other to the body 18, such that when so connected a sealed relationship is achieved whereby high pressure air communicated from the tank through hose 22 is communicated to the high pressure cavity 48 of regulator chamber 46. The high pressure cavity area is defined by the area of the regulator chamber 46 between the high pressure seal 49 mounted to the piston 42 about the head portion 44 and the communication of the high pressure hose 22 with the fitting 24 with the regulator chamber 46. The high pressure so communicated applies pressure to bias the head portion 44 of piston 42 thereby causing the piston 42 to laterally translate in from the force generated in the regulator chamber 46 and compress the piston biasing spring 50. The spring 50 has a bias calculated to resist lateral translation of the piston 42 caused by the bias of incoming air pressure communicated through the hose 22 from the tank and thereby allow the piston mounted O Ring 16 to concurrently move to a point whereby the actual pressure in the tank is displayed by viewing the O Ring 16 through the appropriate slot 12. As noted earlier, as air pressure communicated from the tank is lowered during use, the bias therefrom communicated to the piston 42 will thus be reduced and thus the piston 42 and O Ring 16 mounted thereon will be biased more by the piston spring 50 to reflect the lower pressure when the O ring 16 is viewed by the diver in the aforementioned manner.

Concurrently with providing a real time pressure gauging means, the device 10 also has a regulator 40 which functions to regulate incoming high air pressure from the high pressure air supply, to a lift bag supply port 26 selectively communicable with the low pressure chamber thereby selectively supplying low pressure regulated air to the lift bag be used in combination herewith. Additionally, the device 10 provides a quick-connect outlet 68 which selectively communicates in a sealed relationship when attached, with the low pressure chamber 66.

Air pressure regulation yields a low pressure regulated air supply to low pressure chamber 66 and any selectively connected components, when high pressure air is communicated from the high pressure hose 22 to the high pressure cavity 48 of the regulator chamber 46 and concurrently to the head portion 44 of the piston 42. The high pressure seal 49 provides a sealed relationship between the wall 47 of the regulator chamber 46 and the piston 42 upon which it is operatively mounted.

An axial passage 54 in piston 42 communicates high air pressure though an aperture 52 in the head portion 44 from the high pressure cavity 48 to one or a plurality of exit apertures 56. The exit apertures 56 communicate with a low pressure cavity 58 through selectively sealable piston sleeve openings 60 to a low pressure chamber 66 in which the piston 42 and low pressure seal 16 laterally translate. As pressure in the low pressure chamber 66 reaches a desired level, which is currently best between 110 psi and 140 psi, the piston sleeve 62, which is slidably mounted upon the piston 12 from an open position in figure three biased against a stop 61 in the form of a shoulder formed by the mating of the two parts of the piston 12 where the head portion threads into or is press fit a rear portion piston 12 or in some instances the piston 12 could be of unitary construction and the stop 61 could be provided by a clip or ring or other conventional stopping means mounted thereon. The piston sleeve 62 in operation to maintain pressure is biased by the air pressure in the low pressure chamber 66 communicated directly to the low pressure cavity 58 to laterally translate the piston sleeve 62 with sufficient force to overcome the bias of regulating spring 64 which biases the piston sleeve 62 to a position where the sleeve openings 60 allow communication of the high pressure air supply through exit apertures 56. The building pressure in the low pressure chamber 66 causes the piston to laterally translate in the direction against the bias of regulating spring 64 such that piston sleeve openings 60 are translated to a closed position shown in FIG. 4, out of an in line relationship with exit apertures 56 thereby breaking communication of high pressure air from the axial passage 54 to the low pressure cavity 58 and to the low pressure chamber 66 when the desired pressure is reached in the low pressure chamber 66. This action is continual during used of the device in combination with a compressed air source and maintains the pressure in the low pressure chamber 66 at the desired level which is dictated by the calculated biasing force of the regulating spring 64 which can be set during manufacture by using a spring or other biasing means yielding the bias required to maintain the desired lower pressure in low pressure chamber 66 or by user adjustment as needed using one or a plurality of optional low pressure regulating shims 65 behind the spring 64 to change the biasing level.

Air pressure from the low pressure cavity 58 communicates directly with the low pressure chamber 66 through passageways 59. As pressurized air in the low presser chamber 66 is used for desired purposes by the disclosed or other communicating devices, the volume and hence the pressure level in the low pressure chamber 66 drops causing the piston sleeve 62 to translate to a position allowing communication of air pressure through the piston sleeve openings 60 from the axial passage 48 allowing pressure to be maintained in the low pressure chamber 66 at the desired level.

This regulated lower pressure air in the low pressure chamber 66 is selectively communicable to two separate devices which may be attached to the device herein disclosed. A conventional quick connect fitting 68 for a sealed communication with an appropriately configured mating fitting, is mounted through the wall 19 of body 18. This allows selective communication of air pressure in the low pressure chamber 66 to a device which would be attached using the appropriately configured mating fitting and which would be connected in a sealed relationship with the quick connect fitting 68. In this manner another diver would be able to attach a conventional breathing hose and mouthpiece to the quick connect fitting 68 in an emergency to obtain breathable air. Or, should the need arise for a regulated air supply while submerged for sand blasting, or other reasons conventional in diving, such an air supply can be provided also by connection with the quick connect fitting 69 with an appropriately configured mating fitting which communicates the air supply to whatever device is desired. This ability to attach another mouthpiece eliminates the need for one of the trailing hoses conventionally carried on current diving apparatus and raises the safety level for diving since the potential for hose snagging is reduced and the ease of attachment of any other diver to the qui-connect greatly enhances availability of the air supply in emergencies.

Low pressure chamber 66 also can selectively communicate low pressure air to an outlet chamber 72 and communicating conventional buoyancy compensating air bag through selective communication of the air pressure in low pressure chamber 66 with the outlet chamber 72 by activation of a valve means herein disclosed in the current best mode using an inflation switch 74 which will provide selective communication therebetween. When inflation of the attachable air bag is desired by a diver, the inflation switch 74, which is located in a passageway communicating between low pressure chamber 66 and outlet chamber 72, is activated by depressing inflation button 76. Depressing the button 76 communicates a lateral translation to switch rod 78 which thereby overcomes the bias of inflation biasing spring 80 which in its normal position biases inflation switch 74 to a closed position sealing communication between the low pressure chamber 66 and outlet chamber 72. Activating the inflation switch 74 by depressing button 76 removes the sealing pressure of sealing head 82 upon inflation seal 84 thereby allowing communication of low pressure air from the low pressure chamber 66 through the inflation switch 74 through buoyancy outlet chamber 72 which communicates with the buoyancy bag through the flexible hose attachment 86. More air to the attached bag increases buoyancy of the diver.

When less buoyancy is desired, the attached bag may be deflated by activation of the venting switch 88 which provides user-activated selective venting of air pressure from outlet chamber 72 and communicating conventional lift and decent bag. The venting switch disclosed works in the same fashion as the valve means already described in the current best mode as inflating switch 74. By pressing venting button 90 transmits sufficient force to overcome the sealing bias of outlet spring 83 which unseats the outlet seal 85 by removal of sealing bias from the sealing head 87 on the outlet seal 85 thus allowing communication of air pressure in outlet chamber 72 and communicating lift and decent bag, by venting of air pressure through the outlet chamber 72 and through the venting switch 80 and subsequently through the venting orifice 92 and out to the water or atmosphere. The venting orifice 92 in the current best mode is elongated and shaped to be easily engageable by a diver's mouth though contact thereover by the diver's mouth and lips.

By providing direct communication with the diver's mouth to the lift and decent bag communicating through flexible tube 96 and venting orifice 92 when the venting switch 88 is in the open position, a means for emergency breathing is provided to the diver using the device 10. If the air supply for some reason is cut off to the device through attrition or reason, the diver would have the option of breathing the air in the lift and decent bag by depressing venting switch 88 to place the venting switch in the open or unsealed state and thereby allow direct communication between the venting orifice 92 and the lift and decent bag. This provision of a means for emergency breathing provides the diver a limited air supply to surface with as well as the ability to vent his lungs during an assent of air that will expand therein during assent due to declining pressure.

Alternatively, the direct communication with the lift and decent bag with the venting switch 88 opened also provides a means for use of exhaled air from the diver's lungs to inflate the lift and decent bag. The diver using the device could thus use exhaled air from his lungs to inflate the lift and decent bag by pushing on the venting button 90 to place the venting switch 88 in the open position allowing communication of air exhaled into the venting orifice 92 under slight pressure, to inflate the lift and decent bag. Taking his finger off of the venting button 90 would then place the venting switch to the closed position and maintain the air in the lift and decent bag.

Finally, the selectable communication of the venting orifice 92 with the low pressure chamber 66 provides a means to supply air to the mouth of another diver in an emergency should an additional mouthpiece not be available for connection to quick connect outlet 68. This emergency mouth piece means would be provided by the diver placing his mouth over the venting orifice 92 and depressing the venting button 90 to allow him to take a breath of regulated low pressure air communicated from the low pressure chamber lift and decent bag which could be re-inflated in the aforementioned fashion, or, the diver could communicate air directly from the low pressure chamber 66 to his mouth through the venting orifice 92 by depressing both the venting button 90 and the inflation button 76 thereby opening both valves and providing a direct communication of air from the low pressure chamber to the diver's mouth.

Drawings 6–7 depict a digital embodiment 13 of the device herein disclosed which functions in substantially the same manner as the mechanical embodiment 10, except the user means to determine remaining supply tank pressure is a digital read out 102 mounted to the outside of the digital embodiment 13 and connected to a pressure sensitive plate 106 rather than the reciprocating mechanical means of mechanical embodiment 10 which uses the o-ring 16 mounted thereon viewed through the transparent slots 14. Both the mechanical and digital embodiments however, each feature an easily readable means to gauge remaining tank pressure, which is easily viewed by the user at all times and also concurrently functions as a regulator.

In the digital embodiment, high or unregulated pressure gas from the tank is communicated through a shaft to a conventional electronic pressure sensing means herein depicted as electronic pressure plate 106 which measures the communicated supply pressure and transmits it to a conventional programmable microprocessor 108 such as a ASIC or PIC or similar device. The microprocessor 108 may have software pre-loaded to interpret the pressure related from the pressure plate 106 for communication thereof using the communicating digital readout 102 or may just relay the reading directly to the read out if the plate yields data in the correct format for the read out to use. The microprocessor 108 could also be a computer chip with burned in software and circuitry fit for the purpose intended and is powered by battery 110. The battery 110 and microprocessor 108 and pressure plate 106 and digital readout 102 are wired together in a conventional fashion for such components to provide power from the battery 110 to the microprocessor 108 and digital read out 102 and pressure plate 106, and data to the microprocessor 108. In the current best mode, the microprocessor 108 using the onboard software, interprets the reading from the pressure plate 106 therein transmitting it to the digital readout 102 and yielding a useable pressure reading in pounds per square inch, or the metric equivalent depending on the readout desired. The microprocessor 108 therein may also include software to interpret the time left the user at current rates of consumption or air, and this, and other such information could also be displayed on the digital readout 102 in a conventional fashion. This would provide for easy reading by the user of remaining tank pressure, real time remaining air supply based on current usage, and other useable data regarding life support supplied by the device.

In other aspects of operation of regulating the provided air supply to useable pressures, the device works in an identical fashion to the described mechanical embodiment 10 in that regulated gas at the proper pressure from the low pressure cavity 58 communicates directly with the low pressure chamber 66 through passageways 59a. As pressurized air in the low presser chamber 66 is used for desired purposes by the disclosed or other communicating devices, the volume and hence the pressure level in the low pressure chamber 66 drops causing the piston sleeve 62 to translate to a position allowing communication of air pressure through the piston sleeve openings 60 from the apertures 56 communicating with the axial passage 48. This communicates air from the communicating supply tank or other pressurized air supply means, allowing pressure to be maintained in the low pressure chamber 66 at the desired pressure level for the use intended.

While all of the fundamental characteristics and features of the Air Supply Pressure Regulator with Supply tank Pressure Gauge and Air Supply Port have been shown and described, it should be understood that various substitutions, modifications, and variations, may be made by those skilled in the art, without departing from the spirit or scope of the invention. Consequently, all such modifications and variations are included within the scope of the invention as defined by the following claims.

What is claimed is:

1. An air pressure regulating apparatus with gauging of remaining supply tank pressure comprising:
    a regulator body having two ends and an axial bore therein,
    said axial bore having a wall surface, said wall surface between said two ends defining a low pressure cavity;
    a high pressure cavity axially disposed inside said axial bore, said high pressure cavity communicating at a first end with a supply of compressed air communicating through one of said two ends of said regulator body and at a distal end with said low pressure cavity;
    a piston, said piston having a head portion dimensioned to reciprocate in cooperative sealed engagement within said high pressure cavity, said piston having an exterior circumference portion dimensioned to reciprocate in cooperative sealed engagement with said wall surface of said low pressure cavity;
    said piston having a passageway therethrough having an inlet communicating with said high pressure cavity through said head portion, said passageway communicating with an outlet aperture at a second end, said outlet aperture communicating with said low pressure cavity;
    an outlet chamber located in said regulator body adjacent to said low pressure cavity;
    said low pressure cavity selectively communicating with said outlet chamber by activation of an inflation switch from a biased closed position to an open position, said inflation switch providing communication between said low pressure cavity and said outlet chamber only when in said open position;
    a means for pressure regulation for maintaining said compressed air in said low pressure cavity communicated from said high pressure cavity, at a substantially constant predetermined pressure, said means for pressure regulation mounted upon said head portion of said piston in a position to interrupt communication between said outlet aperture and said low pressure cavity when said predetermined pressure is achieved in said low pressure cavity; and
    means to visually display the pressure of said supply of compressed air being communicated to said high pressure cavity, attached to said regulator body.

2. The air pressure regulating apparatus with gauging of remaining supply tank pressure in claim 1 wherein said means to visually display the pressure of the supply of compressed air being communicated to said high pressure cavity comprises:
    a transparent portion of said regulator body communicating between said regulator body and said wall surface of said low pressure cavity;
    an indicator located on said piston at a position wherein said indicator is viewable through said transparent portion of said regulator body;
    a gauge located on an exterior surface of said regulator body; and
    a means for biasing said piston, said means for biasing said piston providing a calculated bias to said piston and opposite the force of said compressed air being communicated to said piston head in said high pressure cavity, said calculated bias translating said piston and said indicator to a position viewable though said transparent portion of said regulator body, said position allowing the calculation of the pressure of the supply of compressed air being communicated to said high pressure cavity when used in combination with said gauge.

3. The air pressure regulating apparatus with gauging of remaining supply tank pressure in claim 2 wherein said transparent portion is a plurality of transparent sections in said wall surface interrupted by non transparent section.

4. The air pressure regulating apparatus with gauging of remaining supply tank pressure in claim 2 wherein said indicator is an O ring mounted upon said piston, said O ring visible during use through said transparent portion of said wall surface.

5. The air pressure regulating apparatus with gauging of remaining tank pressure in claim 4 wherein said O ring is of a color that is highly visible through said transparent portion of said wall surface.

6. The air pressure regulating apparatus with gauging of remaining tank pressure in claim 4 wherein said O ring is comprised of material that is phosphorescent.

7. The air pressure regulating apparatus with gauging of remaining tank pressure as defined in claim 1, additionally comprising:
    a first exit aperture communicating between said outlet chamber and said exterior surface of said regulator body;
    said first exit aperture engageable in a sealed relationship with an inflatable buoyancy device;
    an inflation switch, said inflation switch biased to a closed position and having an open position; and
    said low pressure cavity communicating with said inflatable buoyancy device when said inflation switch is moved to said open position thereby inflating said inflatable buoyancy device.

8. The air pressure regulating apparatus with gauging of remaining tank pressure as defined in claim 2, additionally comprising:
    a first exit aperture communicating between said outlet chamber and said exterior surface of said regulator body;
    said first exit aperture engageable in a sealed relationship with an inflatable buoyancy device;
    an inflation switch, said inflation switch biased to a closed position and having an open position; and
    said low pressure cavity communicating with said inflatable buoyancy device when said inflation switch is moved to said open position thereby inflating said inflatable buoyancy device.

9. The air pressure regulating apparatus with gauging of remaining tank pressure as defined in claim 4, additionally comprising:
    a first exit aperture communicating between said outlet chamber and said exterior surface of said regulator body;
    said first exit aperture engageable in a sealed relationship with an inflatable buoyancy device;
    an inflation switch, said inflation switch biased to a closed position and having an open position; and
    said low pressure cavity communicating with said inflatable buoyancy device when said inflation switch is moved to said open position thereby inflating said inflatable buoyancy device.

10. The air pressure regulating apparatus with gauging of remaining tank pressure as defined in claim 7 additionally comprising:
- a venting orifice for allowing communicating between said outlet chamber and said exterior surface of said regulator body; and
- a venting switch, biased to a closed position and having an open position; and
- said venting switch moved to said open position permitting communication between said outlet chamber and said venting orifice thereby venting pressurized air from said outlet chamber.

11. The air pressure regulating apparatus with gauging of remaining tank pressure as defined in claim 8 additionally comprising:
- a venting orifice for allowing communicating between said outlet chamber and said exterior surface of said regulator body; and
- a venting switch, biased to a closed position and having an open position; and
- said venting switch moved to said open position permitting communication between said outlet chamber and said venting orifice thereby venting pressurized air from said outlet chamber.

12. The air pressure regulating apparatus with gauging of remaining tank pressure as defined in claim 9 additionally comprising:
- a venting orifice for allowing communicating between said outlet chamber and said exterior surface of said regulator body; and
- a venting switch, biased to a closed position and having an open position; and
- said venting switch moved to said open position permitting communication between said outlet chamber and said venting orifice thereby venting pressurized air from said outlet chamber.

13. The air pressure regulating apparatus with gauging of remaining tank pressure as defined in claim 1 additionally comprising:
- a fitting, said fitting communicating through said wall of said regulator body and having a fitting passage communicating axially therethrough;
- said fitting having a fitting switch having a closed position wherein said fitting passage is blocked, and an open position wherein said fitting passage communicates between said low pressure cavity and said exterior surface of said regulator body; and
- said fitting switch biased to said closed position and moving to said open position when attached to a cooperating connecting hose fastener configured for cooperative engagement with said fitting.

14. The air pressure regulating apparatus with gauging of remaining tank pressure as defined in claim 2 additionally comprising:
- a fitting, said fitting communicating through said wall of said regulator body and having a fitting passage communicating axially therethrough;
- said fitting having a fitting switch having a closed position wherein said fitting passage is blocked, and an open position wherein said fitting passage communicates between said low pressure cavity and said exterior surface of said regulator body; and
- said fitting switch biased to said closed position and moving to said open position when attached to cooperating connecting hose fastener configured for cooperative engagement with said fitting.

15. The air pressure regulating apparatus with gauging of remaining tank pressure as defined in claim 7 additionally comprising:
- a fitting, said fitting communicating through said wall of said regulator body and having a fitting passage communicating axially therethrough;
- said fitting having a fitting switch having a closed position wherein said fitting passage is blocked, and an open position wherein said fitting passage communicates between said low pressure cavity and said exterior surface of said regulator body; and
- said fitting switch biased to said closed position and moving to said open position when attached to cooperating connecting hose fastener configured for cooperative engagement with said fitting.

16. The air pressure regulating apparatus with gauging of remaining tank pressure as defined in claim 8 additionally comprising:
- a fitting, said fitting communicating through said wall of said regulator body and having a fitting passage communicating axially therethrough;
- said fitting having a fitting switch having a closed position wherein said fitting passage is blocked, and an open position wherein said fitting passage communicates between said low pressure cavity and said exterior surface of said regulator body; and
- said fitting switch biased to said closed position and moving to said open position when attached to cooperating connecting hose fastener configured for cooperative engagement with said fitting.

17. The air pressure regulating apparatus with gauging of remaining tank pressure as defined in claim 10 additionally comprising:
- a fitting, said fitting communicating through said wall of said regulator body and having a fitting passage communicating axially therethrough;
- said fitting having a fitting switch having a closed position wherein said fitting passage is blocked, and an open position wherein said fitting passage communicates between said low pressure cavity and said exterior surface of said regulator body; and
- said fitting switch biased to said closed position and moving to said open position when attached to cooperating connecting hose fastener configured for cooperative engagement with said fitting.

18. The air pressure regulating apparatus with gauging of remaining tank pressure as defined in claim 11 additionally comprising:
- a fitting, said fitting communicating through said wall of said regulator body and having a fitting passage communicating axially therethrough;
- said fitting having a fitting switch having a closed position wherein said fitting passage is blocked, and an open position wherein said fitting passage communicates between said low pressure cavity and said exterior surface of said regulator body; and
- said fitting switch biased to said closed position and moving to said open position when attached to cooperating connecting hose fastener configured for cooperative engagement with said fitting.

19. The air pressure regulating apparatus with gauging of remaining tank pressure as defined in claim 1 wherein said means to visually gauge the remaining supply of compressed air being communicated thereto comprises a means for electronic pressure sensing attached to said regulator body and in communication with said high pressure cavity, said means for electronic pressure sensing transmitting detected pressure in said high pressure cavity to a micro processing unit, said micro processing unit transmitting said detected pressure to a means for electronic display of indicia mounted on said exterior surface of said regulator body.

20. The air pressure regulating apparatus with gauging of remaining tank pressure as defined in claim 19, additionally comprising software resident in said micro processing unit, said software calculating real time depletion of said compressed air and displaying a remaining time till total depletion of said compressed air on said means for electronic display of indicia on said exterior surface of said regulator body.

* * * * *